Patented Jan. 28, 1947

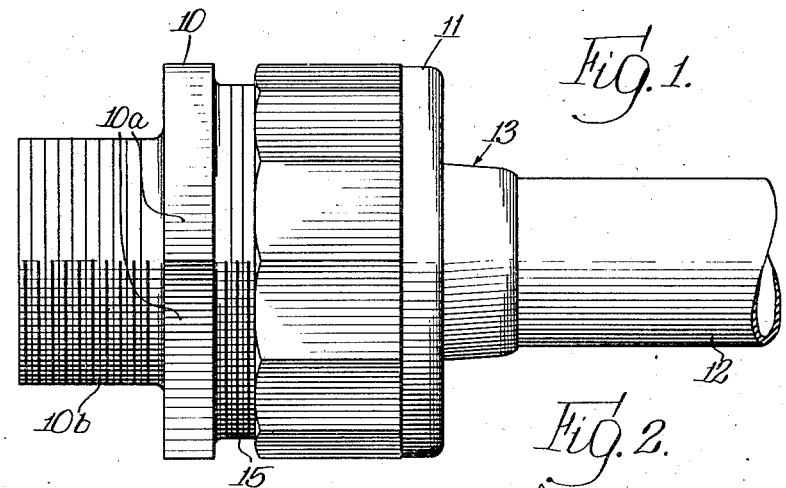
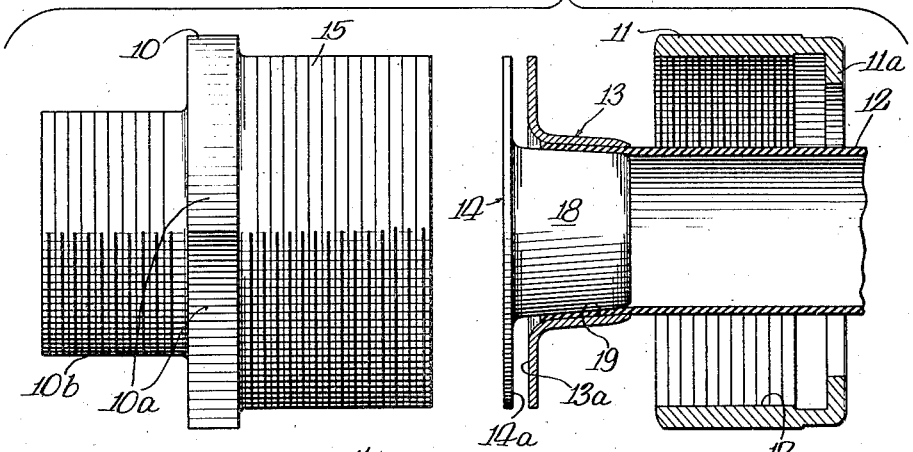
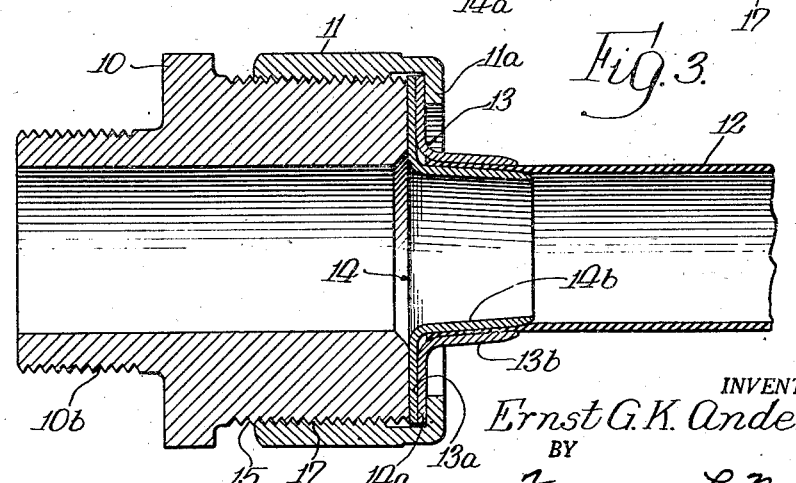

2,414,789

UNITED STATES PATENT OFFICE 2,414,789

COUPLING DEVICE

Ernst G. K. Anderson, Chicago, Ill.; E. Harold Anderson, administrator of said Ernst G. Anderson, deceased, assignor to Simplet Electric Company, Chicago, Ill., a corporation of Illinois Application October 11, 1943, Serial No. 505,760

4 Claims. (Cl. 285—86)

1

The present invention relates to coupling devices and more particularly to improvements in coupling devices or connectors of the character utilized to terminate the ends of soft flexible tubing.

In the end termination of a tube formed of a soft workable metal, it is common practice to utilize a coupling device wherein the end wall portion of the tube is clamped between two members, one of which is connected to an associated vessel, a second tube, a conduit fitting or a conduit box, depending upon the use of the device. Usually, the two members are provided with interengaging threads for drawing the clamping surfaces against the end wall metal tube, and the clamping surfaces bear directly against the opposite sides of the tube end wall. When this type of coupling device is utilized in the end termination of a tube formed of relatively soft flexible material, such, for example, as a thermal plastic material, rubber or the like, having a high coefficient of friction, there is a tendency to score and tear the end wall material of the tube as the clamping operation proceeds. The scoring of the clamped end wall material may be attributed to the fact that relative movement must occur between this material and the engaged clamping surfaces if a satisfactory joint is to be obtained, and has the effect of producing a weakened or broken joint.

It is an object of the present invention, therefore, to provide an improved and exceedingly simple coupling device of the character described, wherein relative movement between the clamping surfaces of the device and the end wall of a connected tube is substantially entirely eliminated during the assembly of the device.

According to another object of the invention, improved and exceedingly simple facilities are provided for maintaining a uniform clamping pressure upon all portions of the tube end at which the connection is made with the coupling device.

In accordance with still another object of the invention, two resilient holding parts, adapted to be preassembled upon the end of the flexible tube with the tube end clamped therebetween and adapted to be received between the clamping surfaces of the device, are used to divorce the end of the tube from the clamping surfaces of the device and thus prevent damage to the tube end during the final assembly operation.

The invention, both as to its organization and method of operation, together with further objects and advantages thereof, will best be understood by reference to the following specification taken in connection with the accompanying drawing, in which:

Fig. 1 is a side view of an improved coupling device characterized by the features of the present invention;

Fig. 2 is a side view, partially in section, illustrating in partially disassembled relationship the elements of the device shown in Fig. 1; and Fig. 3 is a side view in full section illustrating the parts of the device shown in Fig. 1 in their assembled relationship.

Referring now more particularly to the drawing, the coupling device there shown is adapted to terminate or connect with the end of a tube 12 formed of soft flexible material, such, for example, as rubber, a thermal plastic material or the like, and may be utilized to connect the tube 12 with a liquid reservoir, a conduit box, a conduit fitting or another electrical device, depending upon the particular purpose for which the tube 12 is to be utilized. More specifically, the illustrated coupling device is of the union type and is made up of four metal parts 10, 11, 13 and 14. The body part 10 is provided with a threaded end portion 10b which may be threaded into a tapped opening provided in the side wall of a liquid reservoir, conduit box or the like, or may be extended through an unthreaded opening in a vessel or housing to receive a threaded nut upon the inner side of the housing. This part is also provided with the usual flat wrench receiving surfaces 10a which may be utilized in screwing the threaded end 10b into the threaded opening of a vessel or housing side wall. The body part 10 also includes an oppositely extending end portion which is provided with a threaded portion 15 adapted to engage the threads 17 of the clamping member or part 11. These threads coact to clamp the flange portions 13a and 14a of the two tube holding parts 13 and 14 between the inturned flange 11a of the member 11 and the right end of the body part 10.

More specifically considered, the inner holding part 14 is provided with a tubular portion 14b having an inwardly tapering, annular clamping surface at the outer side thereof, over which the end wall portion of the tube 12 may be telescoped and expanded. By virtue of this construction and the expansion of the end wall portion of the tube 12 which occurs incident to the telescoping of the end of the tube over the tapered tubular portion 14b of the holding part 14, the tube end wall is elastically biased so that the inner surface thereof tightly grips the clamping surface 18. The holding part 13 is similarly provided with a tubular portion 13b having a tapering clamping surface 19 formed at the inner side thereof, which surface corresponds in contour to the contour of the clamping surface 16. The two parts may each be constructed by a die stamping operation and are formed of relatively thin gauge metal stock having considerable resiliency. If desired, the clamping surface 18 of the inner holding part 14 may be provided with exceedingly shallow transverse corrugations in order to enhance the gripping action thereof.

In utilizing the device to connect the tube 12 with a reservoir or housing, for example, it will be understood that the end 10b of the body part 10 is first threaded into a suitable tapped opening provided in one wall of the reservoir or housing. The next operation is that of telescoping the two parts 11 and 13 over the end of the flexible tube 12 for a sufficient distance to permit the end wall portion of the tube 12 to be telescoped and expanded over the tapered clamping surface 18 of the holding part 14. With the end portion of the tube 12 thus tensioned over the clamping surface 18, the holding part 13 may be moved back to a position such that the inner clamping surface 19 thereof engages the outer surface of this tube portion. The flanged portions of the two parts 13 and 14 may now be pressed together by finger pressure exerted thereon, thereby tightly to clamp the tube end between the clamping surfaces 18 and 19. When the holding parts 13 and 14 have been thus preassembled upon the end of the tube 12, these two parts and the clamping part 11 may be moved into positions such that the threads 17 are engaged with the end portion 15 of the body part 10, after which the member 11 may be threaded onto the portion 15 of the body member. As the clamping member 11 is rotated relative to the body part 10, a point is reached where the inner surface of the flange 11 is brought to bear against the surface of the flange 13a and the flange 14a is seated against the right end of the body part 10. During continued movement of the clamping member 11 along the body part 10, the space between the two flanges 13a and 14a is gradually closed to decrease the space between the clamping surfaces 18 and 19, and thus tightly clamp the end wall portion of the tube between these surfaces. In this regard it is pointed out that because of the high coefficient of friction of the soft flexible material from which the tube 12 is formed and the initial clamping pressure exerted on the end wall portion of the tube during the assembly of the two parts 13 and 14 thereon, the forces resisting relative rotary movement between the two tube holding parts 13 and 14 substantially exceed the forces tending to produce relative rotary movement between these parts and resulting from the engagement of the flanges 13a and 14a with the two relatively rotating parts 11 and 10. More specifically, the relative rotary movement between the identified parts occurs between the flanges 13a and 14a and the clamping surfaces of the two parts 11 and 10 during final rotation of the clamping member 11 relative to the body part 10. Thus, it will be apparent that the tendency to score or tear the end wall material of the tube 12 is substantially minimized with the above-described structure.

From the foregoing explanation it will be understood that by preassembling the two holding parts 13 and 14 upon the end of the tube 12 and initially telescoping the part 14 within the part 13 a sufficient distance to tightly clamp the tube end between the surfaces 18 and 19, the two parts 13 and 14 are prevented from being rotated relative to each other at any time during the assembly operation. This insures that the desired clamping action upon the end wall material of the tube will be obtained by only a small amount of relative axial movement between the two parts 13 and 14, with an accompanying decrease in the tendency to score or tear this material. It is pointed out further that due to the resiliency of the holding parts 13 and 14, the tubular clamping portions 13b and 14b thereof tend to be self adjusting to provide a substantially uniform clamping pressure over all segments of the tube end wall area held between the surfaces 18 and 19. In other words, resiliency of the two parts 13 and 14 permits the two tapered tubular portions 13b and 14b thereof to be distorted into substantially the same tubular configuration by the opposing radial forces exerted therebetween through the end wall material of the tube as the two tubular portions are telescoped one within the other. Also, the resiliency of the flanges 13a and 14a permits these flanges to be drawn together between the two parts 10 and 11 without distorting the tubular configuration of the two portions 13b and 14b.

While one embodiment of the invention has been disclosed, it will be understood that various modifications may be made therein without departing from the scope of the invention as defined in the appended claims.

I claim:

1. In a coupling device which is adapted to connect with an end of a flexible tube, a pair of relatively rotatable members having oppositely disposed clamping surfaces, a pair of stamped out tube holding members which include flange portions adapted to be clamped between said clamping surfaces and are adapted to be assembled upon the end of said tube prior to assembly of said holding members with said relatively rotatable members, said holding members including elongated tapered tubular parts telescoped one within the other and adapted to receive the end of the tube in clamping engagement therebetween during said preassembly operation, whereby said holding members may be fixedly secured to said tube end before assembly of said holding members and said relatively rotatable members and relative rotary movement between said tubular parts is prevented during the assembly of the named members, and interengaging means carried by said relatively rotatable members to clamp the flange portions of said holding members between said clamping surfaces in response to relative rotation between said relatively rotatable members.

2. A coupling device which is adapted to connect with an end of a flexible tube, comprising a pair of relatively rotatable members having oppositely disposed clamping surfaces, a pair of stamped out holding members which include flange portions adapted to be clamped between said clamping surfaces and are adapted to be assembled upon the end of said tube prior to assembly of said holding members with said relatively rotatable members, said holding members including elongated tubular parts of substantially uniform wall thickness having lengths several times greater than the wall thicknesses thereof, said tubular parts being telescoped one within the other and being adapted to receive the end of the tube therebetween during said preassembly operation and at least one thereof being tapered to provide for clamping of the tube end between said parts in response to relative longitudinal movement of said tubular parts, whereby said holding members may be fixedly secured to said tube end before assembly of said holding members and said relatively rotatable members and relative rotary movement between said tubular parts is prevented during the assembly of the named members, and interengaging means carried by said relatively rotatable members to clamp the flange portions of said holding members between said clamping surfaces in response to relative rotation between said relatively rotatable members.

3. A coupling device which is adapted to connect with an end of a flexible tube, comprising a pair of relatively movable members having oppositely disposed clamping surfaces, a pair of tube holding members which include flange portions adapted to be clamped between said clamping surfaces and are adapted to be assembled upon the end of said tube prior to assembly of said holding members with said relatively rotatable members, said holding members including elongated tubular parts of substantially uniform wall thickness having lengths several times greater than the wall thicknesses thereof, said tubular parts being telescoped one within the other and adapted to receive the end of the tube therebetween during said preassembly operation and at least one thereof being tapered longitudinally to provide for clamping of the tube end between said parts in response to relative longitudinal movement of said tubular parts, whereby said holding members may be fixedly secured to said tube end before assembly of said holding members and said relatively movable members and relative rotary movement between said tubular parts is prevented during the assembly of the named members, and interengaging means carried by said relatively movable members to clamp the flange portions of said holding members between said clamping surfaces in response to relative movement between said relatively movable members.

4. For use in a coupling device which is adapted to connect with an end of a flexible tube and comprises a pair of relatively rotatable members having oppositely disposed clamping surfaces and interengaging means for moving said clamping surfaces toward each other in response to relative rotation therebetween; a pair of tube holding members which include flange portions adapted to be clamped between said clamping surfaces during movement of said clamping surfaces toward each other and are adapted to be assembled upon the end of said tube prior to clamping said flange portions between the clamping surfaces of said relatively rotatable members, said holding members including tapered, elongated and thin walled tubular parts having lengths several times greater than the wall thicknesses thereof, said tubular parts being telescoped one within the other and being adapted to receive the end of the tube therebetween during said preassembly operation to provide for clamping of the tube end between said parts in response to relative longitudinal movement of said tubular parts, whereby said holding members may be fixedly secured to said tube end before assembly of said holding members and said relatively rotatable members and relative rotary movement between said tubular parts is prevented during the assembly of the named members.

ERNST G. K. ANDERSON.